(12) United States Patent
Onodera et al.

(10) Patent No.: US 8,211,576 B2
(45) Date of Patent: Jul. 3, 2012

(54) BLOCK COPOLYMERS AND USE THEREOF

(75) Inventors: Toru Onodera, Tsukuba (JP); Shigeru Sasaki, Tsukuba (JP); Daizaburo Yashiki, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 312 days.

(21) Appl. No.: 10/573,783

(22) PCT Filed: Sep. 24, 2004

(86) PCT No.: PCT/JP2004/014466
§ 371 (c)(1),
(2), (4) Date: Mar. 28, 2006

(87) PCT Pub. No.: WO2005/030840
PCT Pub. Date: Apr. 7, 2005

(65) Prior Publication Data
US 2007/0083010 A1    Apr. 12, 2007

(30) Foreign Application Priority Data

Sep. 30, 2003  (JP) ................................. 2003/339610

(51) Int. Cl.
*B01D 71/80*  (2006.01)
*C08G 65/40*  (2006.01)
*C08G 75/23*  (2006.01)

(52) U.S. Cl. ........ 429/314; 525/534; 525/535; 525/906; 524/86; 524/401; 524/577; 524/609; 429/303; 429/317

(58) Field of Classification Search .................. 525/242, 525/471, 534, 535, 390, 906; 429/27, 30, 429/13, 33, 303, 304, 307, 314, 316, 317; 528/99, 86, 125, 126, 127, 128, 129, 150, 528/154, 151, 158, 171, 212, 218, 219, 391; 427/372.2, 385, 385.5; 523/134, 331, 305; 524/401, 86, 577, 609
See application file for complete search history.

(56) References Cited

U.S. PATENT DOCUMENTS

| | | | |
|---|---|---|---|
| 5,180,750 A | | 1/1993 | Sugaya et al. |
| 5,795,496 A | * | 8/1998 | Yen et al. ..................... 252/62.2 |
| 5,985,477 A | * | 11/1999 | Iwasaki et al. ................. 429/33 |
| 6,451,921 B2 | | 9/2002 | Weisse et al. |
| 7,258,941 B2 | | 8/2007 | Hirano et al. |
| 2001/0021764 A1 | | 9/2001 | Weisse et al. |
| 2001/0041279 A1 | | 11/2001 | Terahara et al. |
| 2002/0045085 A1 | * | 4/2002 | Formato et al. ................. 429/33 |
| 2002/0061431 A1 | | 5/2002 | Koyama et al. |
| 2002/0187377 A1 | | 12/2002 | Shinoda et al. |
| 2004/0039148 A1 | | 2/2004 | Cao et al. |
| 2004/0101730 A1 | | 5/2004 | Hirano et al. |
| 2004/0126666 A1 | | 7/2004 | Cao et al. |
| 2004/0186262 A1 | | 9/2004 | Maier et al. |
| 2004/0220354 A1 | | 11/2004 | Terahara et al. |
| 2005/0069780 A1 | | 3/2005 | Kinouchi et al. |
| 2005/0181256 A1 | | 8/2005 | Cao et al. |
| 2005/0234146 A1 | | 10/2005 | Chen |
| 2006/0135657 A1 | | 6/2006 | Cao et al. |
| 2007/0066759 A1 | | 3/2007 | Onodera et al. |

FOREIGN PATENT DOCUMENTS

| | | |
|---|---|---|
| EP | 1 248 313 A2 | 10/2002 |
| EP | 1 449 886 A1 | 8/2004 |
| JP | 63-258930 A | 10/1988 |
| JP | 2-211257 | 8/1990 |
| JP | 3-41120 | 2/1991 |

(Continued)

OTHER PUBLICATIONS

Daoji Gan et al., "Synthesis and characterization of poly(ether ketone ketone) (PEKK)/sodium sulfonated poly(arylene ether ketone) (S-PAEK) block copolymers", Polymer International, vol. 50, 2001, pp. 812-816.

(Continued)

*Primary Examiner* — Irina S Zemel
*Assistant Examiner* — Jeffrey Lenihan
(74) *Attorney, Agent, or Firm* — Foley & Lardner LLP

(57) ABSTRACT

A block copolymer comprising at least one segment having an acid group which is represented by the following formula (1) and at least one segment substantially free from acid groups which comprises repeating units represented by the following formula (2) is provided:

$$\mathrm{-\!\!\!+\!\!Ar^1\!-\!Y\!-\!Ar^2\!-\!O\!-\!Ar^3\!-\!O\!\!+\!\!\!\!\!-}_m \quad (1)$$

(wherein, m represents an integer of 10 or more, $Ar^1$, $Ar^2$ and $Ar^3$ represent each independently a divalent aromatic group which is optionally substituted by an alkyl group having 1 to 10 carbon atoms, alkoxy group having 1 to 10 carbon atoms, aryl group having 6 to 10 carbon atoms or aryloxy group having 6 to 10 carbon atoms, at least one of $Ar^1$ and $Ar^2$ having an acid group, and $Ar^3$ may have an acid group or may be free from acid groups. Y represents —CO— or —$SO_2$—, and Y's may be different from each other.)

$$\mathrm{-\!\!\!+\!\!Ar^4\!-\!Z\!-\!Ar^5\!-\!O\!\!+\!\!\!\!\!-}_n \quad (2)$$

(wherein, n represents an integer of 10 or more, $Ar^4$ and $Ar^5$ represent each independently a divalent aromatic group which is optionally substituted by an alkyl group having 1 to 10 carbon atoms, alkoxy group having 1 to 10 carbon atoms, aryl group having 6 to 10 carbon atoms, aryloxy group having 6 to 10 carbon atoms or flouro group. Z represents —CO— or —$SO_2$—, and Z's may be different from each other). The block copolymer exerts more excellent performances as the polymer electrolyte in fuel cells and the like.

12 Claims, No Drawings

FOREIGN PATENT DOCUMENTS

| | | |
|---|---|---|
| JP | 2001-250567 | 9/2001 |
| JP | 2001-278978 A | 10/2001 |
| JP | 2002-110174 | 4/2002 |
| JP | 2003-31232 | 1/2003 |
| JP | 2003-206354 A | 7/2003 |
| JP | 2003-292608 | 10/2003 |
| JP | 2004/359925 | 12/2004 |
| WO | WO-02091507 A1 * | 11/2002 |
| WO | WO 03/046080 A1 | 6/2003 |
| WO | WO 2004/042839 A2 | 5/2004 |
| WO | WO 2005/037892 A1 | 4/2005 |

OTHER PUBLICATIONS

Mecham J. et al., "Synthesis and Characterization of Controlled Molecular Weight Sulfonated Aminofunctional Poly(Arylene Ether Sulfone)S Prepared by Direct Polymerization", American Chemical Society, vol. 41, No. 2, Aug. 2000, pp. 1388-1389.

Office Action in CN Appln No: 200480035436.9 dated Jun. 6, 2008.

Office Action in Korean Appln No: 2006-7007879 dated Apr. 13, 2011.

Wang, F. et al. "Sodium sulfonate-functionalized poly(ether ether ketone)s", Macromol. Chem. Phys, 1998, vol. 199, pp. 1421-1426.

* cited by examiner

BLOCK COPOLYMERS AND USE THEREOF

TECHNICAL FIELD

The present invention relates to a block copolymer, and relates to a block copolymer suitably used for polymer electrolytes, particularly, fuel cells, and to a use thereof.

BACKGROUND ART

As a barrier membrane of electrochemical devices such as primary cells, secondary cells, polymer electrolyte fuel cells and the like, a polymer having proton conductivity, namely, a polymer electrolyte is used. For example, polymer electrolytes containing as an effective component an aliphatic polymer having a perfluoroalkylsulfonic acid as a super strong acid in the side chain and a perfluoroalkane in the main chain typically including Nafion (trademark of E.I.DuPont) are conventionally used mainly because of excellent power generation property when used as a membrane material or ion exchange component for fuel cells. However, such a kind of materials are said to have problems such as very high cost, low heat resistance, low membrane strength, leading to less practicality without some reinforcements applied.

Under such conditions, development of a inexpensive polymer electrolyte having excellent properties capable of replacing the above-mentioned polymer electrolyte is being activated recently.

For example, there is suggested a block copolymer having a segment substantially free from an introduced sulfonic acid group and a segment having an introduced sulfonic acid group wherein the former segment is composed of polyether sulfone and the latter segment composed of a repeating unit having an ether bond of diphenylsulfone with biphenol having a sulfonic acid group (Japanese Patent Application Laid-Open (JP-A) No. 2003-031232).

However, the block copolymer as described above is not sufficiently satisfactory as a polymer electrolyte for fuel cells and the like, and copolymers showing more excellent performances are desired.

DISCLOSURE OF THE INVENTION

The present inventors have intensively studied to find a block copolymer showing more excellent performances as a polymer electrolyte for fuel cells and the like and resultantly found that a block copolymer having an acid group in a part of diphenylsulfone or benzophenone skeleton as the segment having an introduced acid group shows excellent performances in various properties such as a membrane forming property, chemical stabilities such as oxidation resistance, radical resistance, hydrolysis resistance and the like, membrane mechanical strength, water resistance and proton conductivity and the like, as a proton conductive membrane for polymer electrolytes, particularly, fuel cells, and further investigated variously, leading to completion of the present invention.

That is, the present invention provides [1] a block copolymer comprising at least one segment having an acid group which is represented by the following formula (1) and at least one segment substantially free from acid groups which comprises repeating units represented by the following formula (2):

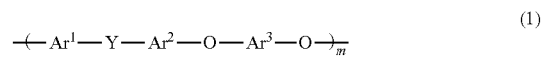

(1)

(wherein, m represents an integer of 10 or more, $Ar^1$, $Ar^2$ and $Ar^3$ represent each independently a divalent aromatic group which is optionally substituted by an alkyl group having 1 to 10 carbon atoms, alkoxy group having 1 to 10 carbon atoms, aryl group having 6 to 10 carbon atoms or aryloxy group having 6 to 10 carbon atoms, at least one of $Ar^1$ and $Ar^2$ having an acid group, and $Ar^3$ may have an acid group or may be free from acid groups. Y represents —CO— or —$SO_2$—, and each Y in the segment being independently —CO— or —$SO_2$—.)

(2)

(wherein, n represents an integer of 10 or more, $Ar^4$ and $Ar^5$ represent each independently a divalent aromatic group which is optionally substituted by an alkyl group having 1 to 10 carbon atoms, alkoxy group having 1 to 10 carbon atoms, aryl group having 6 to 10 carbon atoms, aryloxy group having 6 to 10 carbon atoms or fluoro group. Z represents —CO— or —$SO_2$—, and each Z in the segment being independently —CO— or —$SO_2$—).

Also, the present invention provides

[2] the block copolymer according to [1], wherein the weight composition ratio of the segment having an acid group to the segment substantially free from acid groups is from 5:95 to 40:60.

Further, the present invention provides

[3] the block copolymer according to [1] or [2], wherein the acid group is a strong acid group or a super strong acid group,

[4] the block copolymer according to any of [1] to [3], wherein the segment substantially free from acid groups is represented the following formula (3):

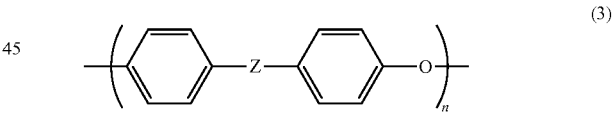

(3)

(wherein, n and Z have the same meaning as described above.),

[5] the block copolymer according to [4], wherein the segment having an acid group is represented by the following formula (4):

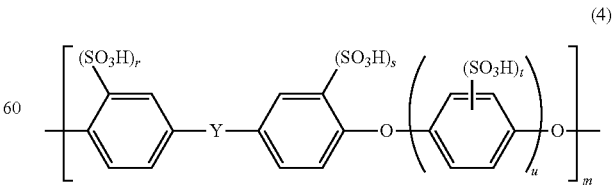

(4)

(wherein, m and Y have the same meaning as described above. r and s represent each independently 0 or 1, and r+s being 1 or 2. u represents 1 or 2, and t represents 0, 1 or 2.),

[6] the block copolymer according to any of [1] to [5], wherein the ion exchange capacity is 0.8 meq/g to 2.4 meq/g,

[7] a polymer electrolyte comprising the block copolymer according to any of [1] to [6] as an effective component,

[8] a polymer electrolyte membrane comprising the polymer electrolyte according to [7],

[9] a polymer electrolyte composite membrane comprising the polymer electrolyte according to [7], and a porous substrate,

[10] a catalyst composition comprising the polymer electrolyte according to [7], and

[11] a polymer electrolyte fuel cell comprising at least one selected from the polymer electrolyte membrane according to [8], the polymer electrolyte composite membrane according to [9], and the catalyst composition according to [10].

BEST MODES FOR CARRYING OUT THE INVENTION

The present invention is described in detail below.

The block copolymer of the present invention is a block copolymer comprising at least one segment having an acid group and at least one segment substantially free from acid groups, and is characterized in that the segment having an acid group is constituted of a repeating structure of the formula (1), namely, at least one of $Ar^1$ and $Ar^2$ has an acid group. $Ar^3$ may have an acid group or may be free from acid groups.

$Ar^1$, $Ar^2$ and $Ar^3$ in the formula (1) represent each independently a divalent aromatic group, and the divalent aromatic group includes hydrocarbon aromatic groups such as phenylene, naphthylene, biphenylylene, fluorenediyl and the like, hetero aromatic groups such as pyridinediyl, quinoxalinediyl, thiophenediyl and the like. Preferable are divalent hydrocarbon aromatic groups.

Here, the divalent aromatic group may be substituted by an alkyl group having 1 to 10 carbon atoms optionally having a substituent, alkoxy group having 1 to 10 carbon atoms optionally having a substituent, aryl group having 6 to 10 carbon atoms optionally having a substituent, aryloxy group having 6 to 10 carbon atoms optionally having a substituent, and the like, and examples of the alkyl group having 1 to 10 carbon atoms optionally having a substituent include alkyl groups having 1 to 10 carbon atoms such as methyl, ethyl, n-propyl, isopropyl, allyl, n-butyl, sec-butyl, tert-butyl, isobutyl, n-pentyl, 2,2-dimethylpropyl, cyclopentyl, n-hexyl, cyclohexyl, 2-methylpentyl, 2-ethylhexyl and the like, and alkyl groups obtained by substitution with a halogen atom such as a fluorine atom, chlorine atom, bromine atom and iodine atom, a hydroxyl group, nitrile group, amino group, methoxy group, ethoxy group, isopropyloxy, phenyl, naphthyl, phenoxy, naphthyloxy or the like on these groups, and the like.

Examples of the alkoxy group having 1 to 10 carbon atoms optionally having a substituent include alkoxy groups having 1 to 10 carbon atoms such as methoxy, ethoxy, n-propyloxy, isopropyloxy, n-butyloxy, sec-butyloxy, tert-butyloxy, isobutyloxy, n-pentyloxy, 2,2-dimethylpropyloxy, cyclopentyloxy, n-hexyloxy, cyclohexyloxy, 2-methylpentyloxy, 2-ethylhexyloxy and the like, and alkoxy groups obtained by substitution with a halogen atom such as a fluorine atom, chlorine atom, bromine atom and iodine atom, a hydroxyl group, nitrile group, amino group, methoxy group, ethoxy group, isopropyloxy, phenyl, naphthyl, phenoxy, naphthyloxy or the like on these groups, and the like.

Examples of the aryl group having 6 to 10 carbon atoms optionally having a substituent include aryl groups having 6 to 10 carbon atoms such as phenyl, naphtyl and the like, and aryl groups obtained by substitution with a halogen atom such as a fluorine atom, chlorine atom, bromine atom and iodine atom, a hydroxyl group, nitrile group, amino group, methoxy group, ethoxy group, isopropyloxy, phenyl, naphthyl, phenoxy, naphthyloxy or the like on these groups, and the like.

Examples of the aryloxy group having 6 to 10 carbon atoms optionally having a substituent include aryloxy groups having 6 to 10 carbon atoms such as phenoxy, naphtyloxy and the like, and aryloxy groups obtained by substitution with a halogen atom such as a fluorine atom, chlorine atom, bromine atom and iodine atom, a hydroxyl group, nitrile group, amino group, methoxy group, ethoxy group, isopropyloxy, phenyl, naphthyl, phenoxy, naphthyloxy or the like on these groups, and the like.

$Ar^1$, $Ar^2$ and $Ar^3$ in the formula (1) represent a divalent aromatic group optionally having the substituent as described above, and particularly, $Ar^1$ and $Ar^2$ are more preferably phenylene and $Ar^3$ is more preferably phenylene, biphenylene or the like.

The present invention is characterized in that at least one of $Ar^1$ and $Ar^2$ among $Ar^1$, $Ar^2$ and $Ar^3$ as described above has an acid group. $Ar^3$ may have an acid group or may be free from acid groups, and it is preferable that $Ar^3$ has an acid group.

Here, examples of the acid group include weak acid groups such as carboxylic acid, phosphonic acid and the like, strong acid groups such as sulfonic acid and the like, super strong acid groups such as perfluoroalkylenesulfonic acid, perfluorophenylenesulfonic acid, perfluoroalkylenesulfonylimide and the like. Of them, strong acid groups and super strong acid groups are preferable, and for example, sulfonic acid, perfluoroalkylenesulfonic acid, perfluorophenylenesulfonic acid and the like are suitably used.

The amount of such an acid group is preferably 0.5 or more on average per aromatic ring in the formula (1) constituting a repeating unit, and particularly preferably one in substantially all aromatic rings.

Y in the formula (1) represents —CO— or —SO$_2$—. Y's in the segment represent each independently —CO— or —SO$_2$—, and it is preferable that all of them are identical.

Preferable examples of the segment of the formula (1) include segments of the following formulae (4), (1)-1 to (1)-4. A segment of the formula (4) is more preferable.

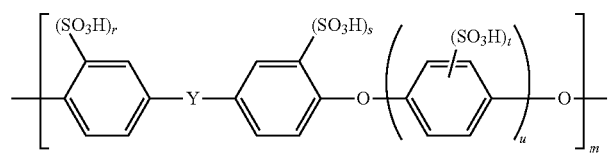

(4)

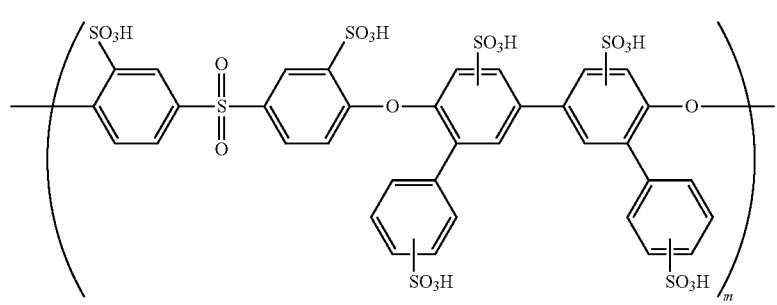
(1)-1
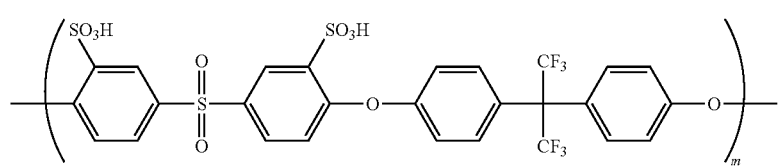
(1)-2
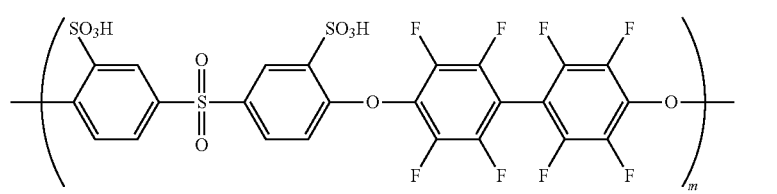
(1)-3
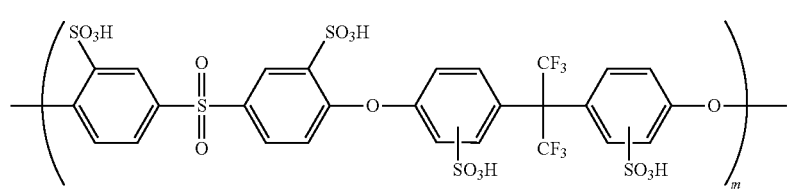
(1)-4
(wherein, m and Y have the same meaning as described above. r and s represent each independently 0 or 1, and r+s being 1 or 2. u represents 1 or 2, and t represents 0, 1 or 2).
Here, typical examples of the segment of the formula (4) include the following segments.
In the formula, m has the same meaning as described above.
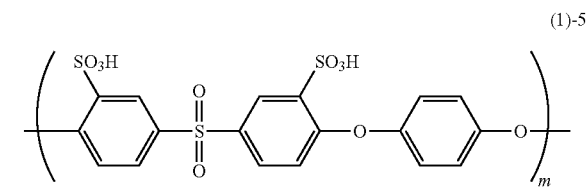
(1)-5
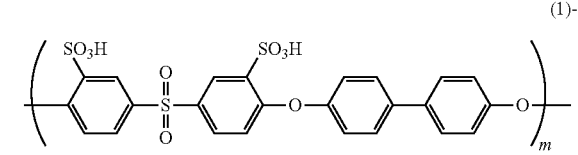
(1)-6
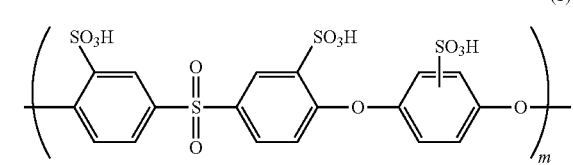
(1)-7
-continued
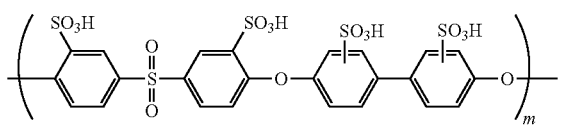
(1)-8
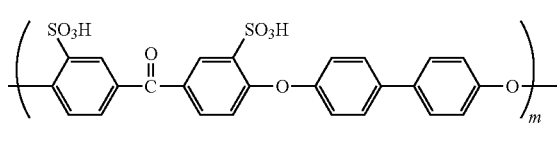
(1)-9
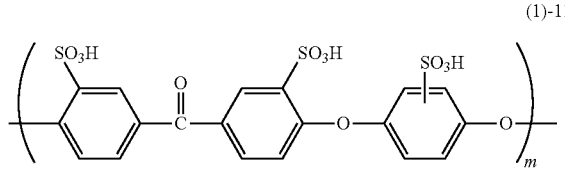
(1)-10
(1)-11

-continued

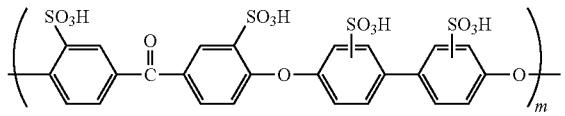

(1)-12

The block copolymer of the present invention is characterized by containing the segment having an acid group as described above, and contains a segment substantially free from acid groups represented by the above-mentioned formula (2) in addition to such segments.

Here, as the segment substantially free from acid groups, those having an acid group content of 0.1 or less on average per repeating unit constituting the segment are mentioned.

$Ar^4$ and $Ar^5$ in the formula (2) represent each independently a divalent aromatic ring, and typical examples thereof include divalent monocyclic aromatic rings such as 1,3-phenylene, 1,4-phenylene and the like, divalent condensed aromatic groups such as 1,3-naphthalenediyl, 1,4-naphthalenediyl, 1,5-naphthalenediyl, 1,6-naphthalenediyl, 1,7-naphthalenediyl, 2,6-naphthalenediyl, 2,7-naphthalenediyl and the like, divalent biphenylylene groups such as 3,3'-biphenylylene, 3,4'-biphenylylene, 4,4'-biphenylylene and the like.

These divalent aromatic rings may be substituted by an alkyl group having 1 to 10 carbon atoms, alkoxy group having 1 to 10 carbon atoms, aryl group having 6 to 10 carbon atoms, aryloxy group having 6 to 10 carbon atoms or fluoro group, and as specific examples of the alkyl group having 1 to 10 carbon atoms, alkoxy group having 1 to 10 carbon atoms, aryl group having 6 to 10 carbon atoms or aryloxy group having 6 to 10 carbon atoms, the same groups as for $Ar^1$, $Ar^2$ and $Ar^3$ are mentioned.

Particularly, it is preferable that $Ar^4$ and $Ar^5$ are not substituted or substituted by a fluoro group.

Z in the formula (2) represents —CO— or —SO$_2$—. Z's in the segment represent each independently —CO— or —SO$_2$—, and it is preferable that they represent the same group.

As typical examples of the segment substantially free from acid groups, segments originated from polyether ketone optionally substituted by, for example, the substituent as described above are mentioned when Z represents —CO—, and segments originated from polyether sulfone optionally substituted by the substituent as described above are mentioned when Z represents —SO$_2$—, and segments originated from polyether ketone ether sulfone optionally substituted by the substituent as described above are mentioned when both of them are contained. Among them, segments of the following general formula (3) are preferably used.

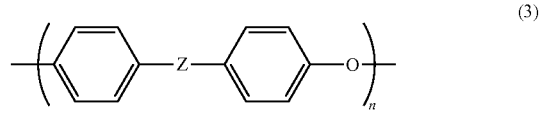

(3)

(wherein, n and Z have the same meaning as described above).

The block copolymer of the present invention contains a segment of the formula (1) having the acid group as described above and a segment of the formula (2) substantially free from acid groups, as the segment, and typical examples thereof include the following block copolymers.

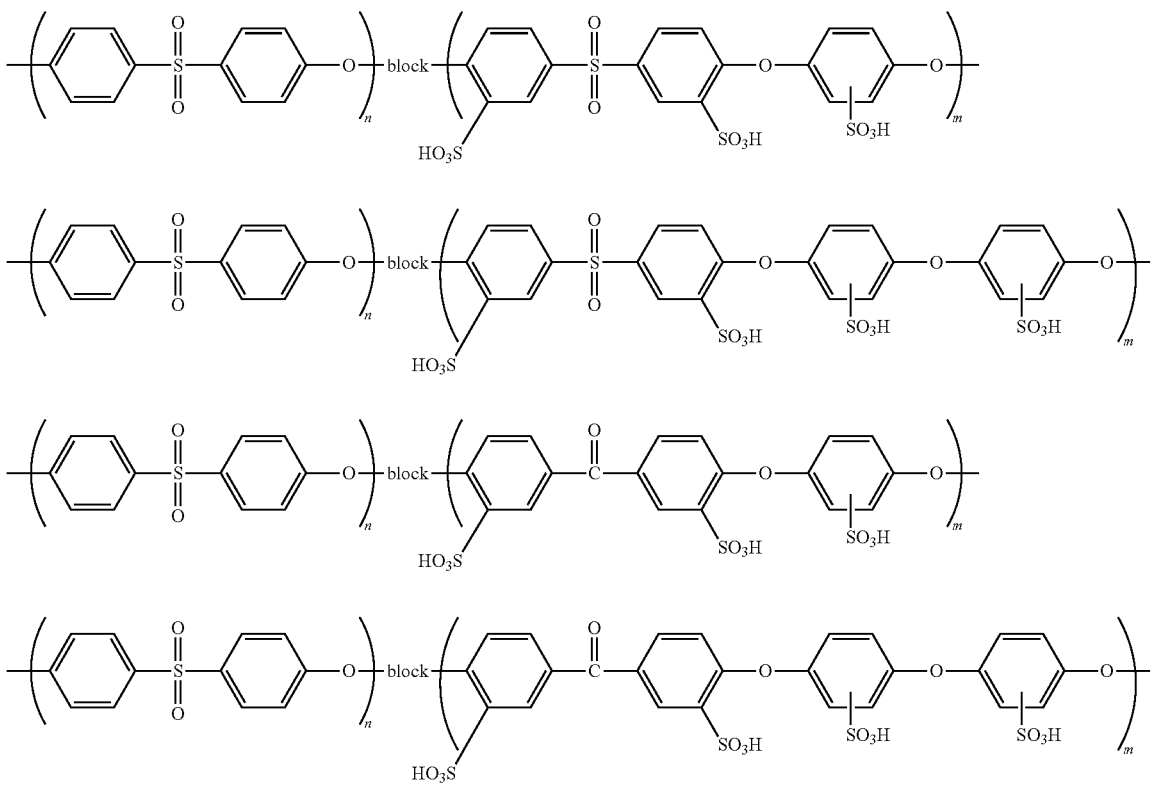

-continued

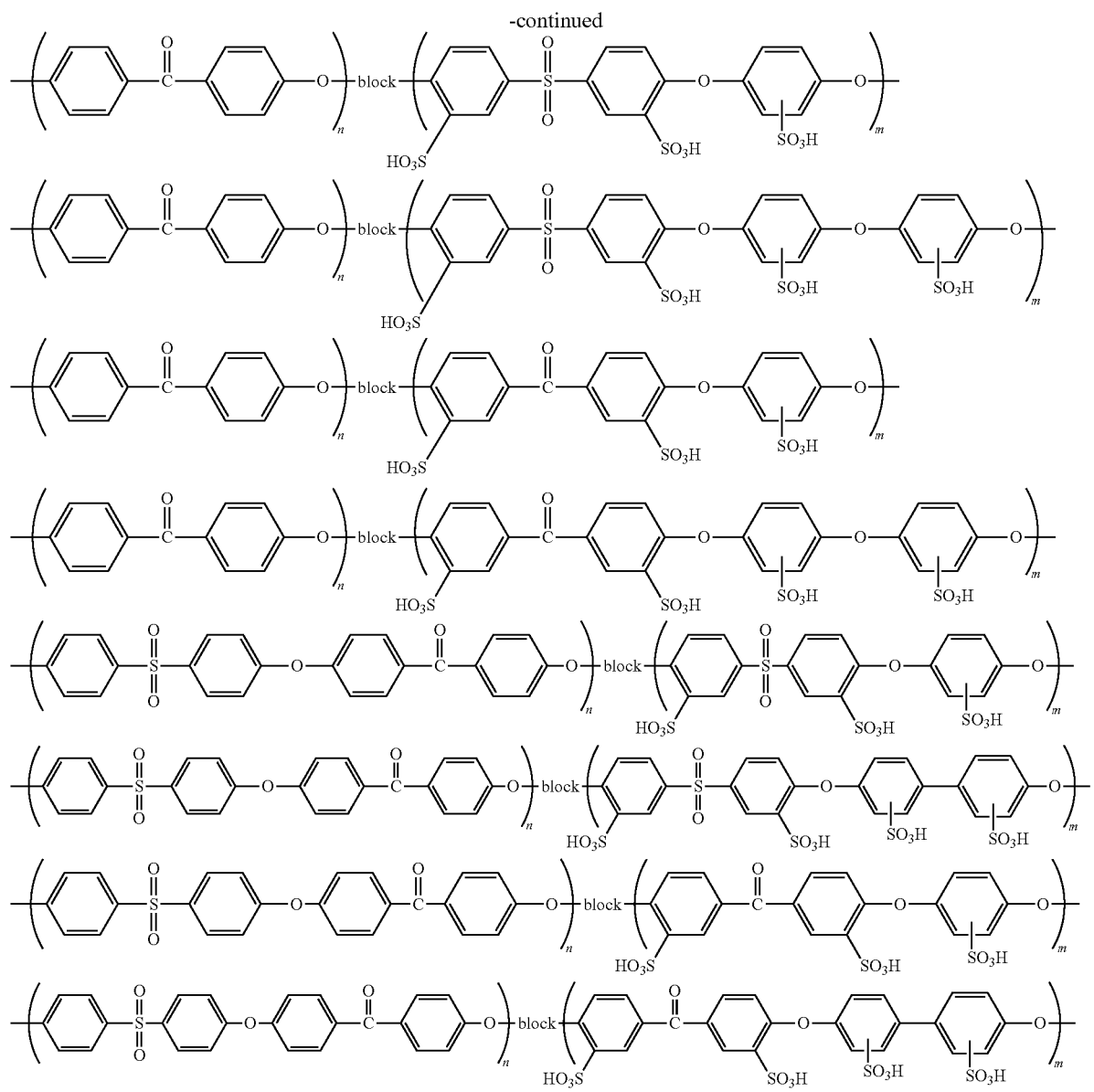

As the method of producing a block copolymer of the present invention, there are listed, for example, I. a method in which a block copolymer composed of an un-sulfonated body of a segment of the formula (1) (hereinafter, abbreviated as un-sulfonated segment of the formula (1)) and a segment of the formula (2) is produced, then, an acid group is introduced selectively into a portion corresponding to the un-sulfonated segment of the formula (1), II. a method in which a polymer having an introduced acid group as a segment of the formula (1) is produced, then, this is bonded to a polymer composed of a segment of the formula (2) to obtain a block copolymer, III. a method combining the above-mentioned methods I and II, and the like.

Here, the block copolymer composed of an un-sulfonated segment of the formula (1) and a segment of the formula (2) in the method I can be produced by combining and reacting a polymer having an un-sulfonated segment of the formula (1) and in which both ends of the polymer are composed of a hydroxyl group or halogen atom or one end thereof is composed of a hydroxyl group and another end is composed of a halogen atom with a polymer having a segment of the formula (2) and in which both ends of the polymer are composed of a hydroxyl group or halogen atom or one end thereof is composed of a hydroxyl group and another end is composed of a halogen atom.

For example, a. a method in which a polymer with a hydroxyl group on both ends and a polymer with a halogen atom on both ends are condensed in nucleophilic substitution manner under the effect of a base, b. a method in which a polymer with a hydroxyl group on one end and a halogen atom on another end and another polymer with a hydroxyl group on one end and a halogen atom on another end are condensed in nucleophilic substitution manner under the effect of a base, c. a method in which a polymer with a hydroxyl group on both ends and another polymer with a hydroxyl group on both ends are bonded using a compound acting as a connecting group such as decafluorobiphenyl, hexafluorobenzene, 4,4'-difluorobenzophenone, 4,4'-difluorodiphenylsulfone and the like, d. a method in which a polymer with a halogen atom on both ends and another polymer with a halogen atom on both ends are bonded using a compound acting as a connecting group such as 4,4'-dihydroxybiphenyl, bisphenol A, 4,4'-dihydroxybenzophenone, 4,4'-diydroxydiphenylsulfone and the like, or by a de-halogen condensation reaction, and the like, are exemplified. Also, the block copolymer can be produced by a polymerization reaction of a monomer and a polymer having a reactive group capable of causing the same reaction as the above-mentioned reaction.

Here, in producing a block copolymer using a connecting group as described in the above-mentioned method c, a block copolymer having a branched structure can be produced by controlling the reaction conditions in the case of using a poly-functional connecting group such as decafluorobiphenyl, hexafluorobenzene and the like.

In this case, a block copolymer having a linear structure and a block copolymer having a branched structure can be produced severally by changing the charging composition of a polymer having an un-sulfonated segment of the formula (1) and a polymer having a segment of the formula (2).

As the method of introducing an acid group into a block copolymer composed of an un-sulfonated segment of the formula (1) and a segment of the formula (2), there is, for example, I-1. a method in which a sulfonic acid group is introduced by dissolving or suspending a block copolymer in concentrated sulfuric acid or fuming sulfuric acid, or by dissolving at least partially a block copolymer in an organic solvent, then, allowing concentrated sulfuric acid, chlorosulfuric acid, fuming sulfuric acid, sulfur trioxide and the like to act on this.

When a block copolymer is produced using the above-mentioned method II, namely, by producing a polymer having an introduced acid group as a segment of the formula (1), then, bonding this to a polymer composed of a segment of the formula (2), for example, the polymer having an introduced acid group can be produced according to the above-mentioned acid group introducing method I-1 (II-1), or can be produced by polymerizing a monomer having a previously introduced acid group (II-2). Also, the block copolymer can be produced, for example, by the same method as described above.

Here, for introducing a certain amount of sulfonic acid group under strict control into an aromatic group having an electron attractive group like the segment of the formula (1), an excellent result can be obtained by using the method II-2 rather than using the method II-1.

The block copolymer obtained by the above-mentioned method and the like can be identified by NMR, GPC, IR and the like.

Thus, a block copolymer of the present invention is obtained, and the content of an acid group in the whole block copolymer is preferably from 0.1 mmol to 4.0 mmol per g of a polymer electrolyte as a block copolymer (ion exchange capacity: 0.1 meq/g to 4.0 meq/g), and in terms of ion exchange capacity, particularly preferably from 0.8 meq/g to 2.4 meq/g, and especially preferably from 1.3 meq/g to 2.0 meq/g. When the acid group content is too small, proton conductivity lowers and a function as a polymer electrolyte for fuel cells becomes insufficient in some cases, while when the acid group content is too large, water resistance becomes undesirably poor in some cases. The content of an acid group can be quantified by a titration method, NMR and the like.

The weight composition ratio of a segment having an acid group to a segment substantially free from acid groups is not particularly restricted, and usually from 3:97 to 70:30, preferably from 5:95 to 40:6, further preferably from 10:90 to 33:67, particularly preferably from 15:85 to 30:70. When the amount of the segment free from acid groups is too small, proton conductivity lowers and a function as a polymer electrolyte for fuel cells becomes insufficient in some cases, while when the amount of the segment having an acid group is too large, water resistance becomes undesirably poor in some cases.

The acid group content of the whole block copolymer can be optionally controlled by changing the number of an acid group in a segment having the acid group and/or block composition and/or number-average molecular weight of each block.

The average molecular weight of a block copolymer of the present invention is preferably 5000 to 1000000, particularly preferably 15000 to 200000 in terms of number-average molecular weight reduced by polystyrene.

The average molecular weight of the segment having an acid group is preferably 2000 to 100000, particularly preferably 4000 to 50000 in terms of number-average molecular weight reduced by polystyrene. The average molecular weight of the segment substantially free from acid groups is preferably 5000 to 200000, particularly preferably 10000 to 100000 in terms of number-average molecular weight reduced by polystyrene.

The block copolymer of the present invention contains at least one segment having an acid group and at least one segment substantially free from acid groups, and cases of so-called multi block such as a case in which at least one of them is present in plural number, a case in which both segments are present each in plural number, are particularly preferable.

Next, a case using a block copolymer of the present invention as a barrier membrane of an electrochemical device of fuel cells and the like is described below.

In this case, the block copolymer of the present invention is usually used in the form of film, and a method of converting into a film is not particularly restricted, and for example, a method of forming a membrane from solution condition (solution cast method) is preferably used.

Specifically, a copolymer is dissolved in a suitable solvent, the solution is cast on a glass plate, and the solvent is removed to form a membrane. The solvent used of membrane formation is not particularly restricted providing it can dissolve a copolymer and thereafter it can be removed, and aprotic polar solvents such as N,N-dimethylformamide, N,N-dimethylacetamide (DMAc), N-methyl-2-pyrrolidone (NMP), dimethyl sulfoxide (DMSO) and the like, chlorine-based solvents such as dichloromethane, chloroform, 1,2-dichloroethane, chlorobenzene, dichlorobenzene and the like, alcohols such as methanol, ethanol, propanol and the like, and alkylene glycol monoalkyl ethers such as ethylene glycol monomethyl ether, ethylene glycol monoethyl ether, propylene glycol monomethyl ether, propylene glycol monoethyl ether and the like, are suitably used. These can be used singly and, if necessary, two or more solvents can also be used in admixture. Among them, dimethyl sulfoxide, N,N-dimethylformamide, N,N-dimethylacetamice, N-methylpyrrolidone and the like are preferable since they have high solubility of a polymer.

The thickness of a film is not particularly restricted, and preferably from 10 to 300 μm, particularly preferably from 20 to 100 μm. When thinner than 10 μm, practical strength is not sufficient in some cases, and when thicker than 300 μm, membrane resistance tends to increase to lower the property of an electrochemical device. The membrane thickness can be controlled by the concentration of a solution and the applied thickness on a substrate.

For the purpose of improving various physical properties of a film, plasticizers, stabilizers, releasing agents and the like used in usual polymers can be added to a block copolymer of the present invention. Further, other polymers can also be made into a composite alloy together with a copolymer of the present invention by a method of mixed co-casting in an identical solvent, and the like.

Additionally, for making water control easy in a fuel cell application, it is also known to add inorganic or organic fine particles as a water holding agent. Any of these known methods can be used providing they do not act counter to the object of the present invention. Further, it is also possible to cross-link a film by irradiation with electron beam, radiation and the like for the purpose of improving the mechanical strength of a film, and the like.

For further improving the strength, flexibility and durability of a polymer electrolyte membrane, it is also possible to impregnate a porous substrate with a polymer electrolyte of the present invention, to give a composite membrane. For compositing, known methods can be used. The porous substrate is not particularly restricted providing it satisfies the above-mentioned use object, and for example, porous membranes, woven fabrics, non-woven fabrics, fibrils and the like are mentioned and can be used irrespective of its shape and material.

When a polymer electrolyte composite membrane using a block copolymer of the present invention is used as a barrier membrane of a polymer electrolyte fuel cell, the porous substrate has a membrane thickness of 1 to 100 µm, preferably 3 to 30 µm, further preferably 5 to 20 µm, a pore diameter of 0.01 to 100 µm, preferably 0.02 to 10 µm, and a void percentage of 20 to 98%, preferably 40 to 95%.

When the membrane thickness of a porous substrate is too small, an effect of reinforcing strength after compositing or a reinforcing effect of imparting flexibility and durability becomes insufficient, and gas leakage (cross leak) tends to occur. When the membrane thickness is too large, electric resistance increases, and the resulting composite membrane becomes in sufficient as a barrier membrane of a polymer electrolyte fuel cell. When the pore diameter is too small, filling of a polymer solid electrolyte is difficult, and when too large, a reinforcing effect for a polymer solid electrolyte becomes weak. When the void percentage is too small, resistance as a solid electrolyte membrane increases, and when too large, the strength of a porous substrate itself generally becomes weak to lower a reinforcing effect.

In view of heat resistance and an effect of reinforcing physical strength, aliphatic polymers, aromatic polymers or fluorine-containing polymers are preferable.

Next, the fuel cell of the present invention is described. As the fuel cell using a polymer electrolyte, there are, for example, a polymer electrolyte fuel cell using a hydrogen gas as a fuel, and a direct methanol polymer electrolyte fuel cell directly feeding methanol as a fuel, and the copolymer of the present invention can be suitably used for both of them.

The fuel cell of the present invention includes that using a copolymer of the present invention as a polymer electrolyte membrane and/or polymer electrolyte composite membrane, that using a polymer electrolyte of the present invention as a polymer electrolyte in a catalyst layer, and the like.

The fuel cell using a copolymer of the present invention as a polymer electrolyte membrane and/or polymer electrolyte composite membrane can be produced by conjugating a catalyst and a gas diffusion layer to both surfaces of a polymer electrolyte membrane and/or polymer electrolyte composite membrane. As the gas diffusion layer, known materials can be used, and porous carbon woven fabric, carbon non-woven fabric or carbon paper is preferable for efficiently transporting a raw material gas to a catalyst.

Here, the catalyst is not particularly restricted providing it can activate a redox reaction with hydrogen or oxygen, and known catalysts can be used, and preferable is use of platinum fine particles. Platinum fine particles are often carried on particulate or fibrous carbon such as activated carbon, graphite and the like, and preferably used. Further, platinum carried on carbon is mixed together with an alcohol solution of a perfluoroalkylsulfonic acid resin as a polymer electrolyte to give a paste which is applied on a gas diffusion layer and/or polymer electrolyte membrane and/or polymer electrolyte composite membrane and dried to obtain a catalyst layer. Specifically, known methods such as a method described, for example, in J. Electrochem. Soc.: Electrochemical Science and Technology, 1988, 135 (9), 2209 can be used.

As the fuel cell using a copolymer of the present invention as a polymer electrolyte in a catalyst layer, those using a copolymer of the present invention instead of a perfluoroalkylsulfonic acid resin constituting the above-mentioned catalyst layer are mentioned. As the solvent which can be used in obtaining a catalyst layer using a copolymer of the present invention, the same solvents as listed as the solvent which can be used in forming a membrane of a copolymer are mentioned. When a catalyst layer using a copolymer of the present invention is used, the polymer electrolyte membrane is not limited to a membrane using a copolymer of the present invention, and known polymer electrolyte membranes can be used.

The present invention is described by the following examples, but the scope of the invention is not limited to these examples at all.

Measurement of Molecular Weight:

The number-average molecular weight (Mn) based on the polystyrene calibration standard was measured under the following conditions by gel permeation chromatography (GPC).

GPC measurement apparatus: manufactured by TOSOH; HLC-8220

Column: manufactured by Shodex; two KD-80M's are connected in series

Column temperature: 40° C.

Mobile phase solvent: DMAc (LiBr is added so as to give 10 mmol/dm$^3$)

Solvent flow rate: 0.5 mL/min

Measurement of Proton Conductivity:

Proton conductivity was measured by an alternating current method under a temperature of 80° C. and a relative humidity of 90%.

Measurement of Ion Exchange Capacity:

Ion exchange capacity was measured by a titration method.

Measurement of Methanol Permeation Coefficient:

A polymer electrolyte membrane to be measured was pinched at the center of a H-letter shaped barrier membrane cell composed of cell A and cell B, and a 10 wt % methanol aqueous solution was placed in cell A and pure water was placed in cell B, and the methanol concentrations in cells A and B after a certain time at 23° C. were analyzed, and the methanol permeation coefficient D (cm²/sec) was calculated according to the following formula.

$$D = \{(V \times l)/(A \times t)\} \times \ln\{(C_1 - C_m)/(C_2 - C_n)\}$$

V: volume of liquid in cell B (cm³)
l: thickness of electrolyte membrane (cm)
A: cross sectional area of electrolyte membrane (cm²)
t: time (sec)
$C_1$: solute concentration in cell B at t=1 (mol/cm³)
$C_2$: solute concentration in cell B at t=2 (mol/cm³)
$C_m$: solute concentration in cell A at t=1 (mol/cm³)
$C_n$: solute concentration in cell A at t=2 (mol/cm³)

Here, the methanol permeation coefficient D was calculated hypothesizing that the methanol permeation amount is sufficiently small, V is the initial pure water volume and represents a constant value, and $C_m = C_n$ = initial concentration (10 wt %).

Evaluation of Power Generation Property

A platinum catalyst carried on fibrous carbon and porous carbon woven-fabric as a collector were connected to both surfaces of a polymer electrolyte membrane and/or polymer electrolyte composite membrane. A humidified oxygen gas was flowed on one surface of the unit and a humidified hydrogen gas was flowed on another surface thereof, and a power generation property was measured.

Porous Substrate

A polyethylene porous membrane described below produced according to Japanese Patent Application Laid-Open (JP-A) No. 2002-309024 was used. The average pore diameter shows a value measured by a bubble point method, ASTM F316-86.

Polyethylene porous membrane A: average pore diameter d=60 nm

REFERENCE EXAMPLE 1

Production of Polyether Sulfone (Fluorine End Type)

Into a flask equipped with an azeotropic distillation apparatus was added 1000 g of Sumika Excell PES4003P (manufactured by Sumitomo Chemical Co., Ltd., hydroxyl group end type polyether sulfone), 7.59 g of potassium carbonate, 2500 ml of DMAc and 500 ml of toluene under a nitrogen atmosphere, and the mixture was stirred with heating at 160° C. to cause azeotropic dehydration. The mixture was allowed to cool at room temperature, then, 53.6 g of decafluorobiphenyl was added and the mixture was stirred with heating at 80° C. for 3.5 hours. The reaction mixture was dropped into a large amount of water, the resulting precipitate was recovered by filtration, washed with a methanol/acetone mixed solvent, then, dried at 80° C. to obtain a fluorine end type polymer described below (hereinafter, referred to as P1).

$Mn = 3.2 \times 10^4$

REFERENCE EXAMPLE 2

Production of Polyether Sulfone (Fluorine End Type)

A fluorine end type polymer described below (hereinafter, referred to as P2) was obtained according to Reference Example 1 excepting that decafluorobiphenyl was substituted by hexafluorobenzene. $Mn = 5.1 \times 10^4$

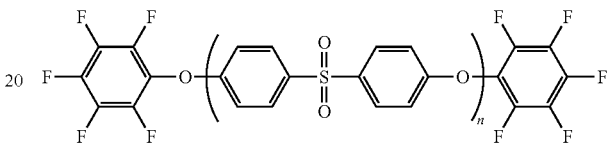

EXAMPLE 1

Production of Block Copolymer a

Into a flask equipped with an azeotropic distillation apparatus was added 1.52 g (8.16 mmol) of 4,4'-dihydroxybiphenyl, 3.92 g (7.99 mmol) of dipotassium 4,4'-difluorodiphenylsulfone-3,3'-disulfonate and 1.24 g (8.97 mmol) of potassium carbonate under an Ar atmosphere, and 100 mL of DMSO and 30 mL of toluene were added. Thereafter, toluene was distilled off with heating at a bath temperature of 140° C. to cause azeotropic dehydration in the system, and the mixture was stirred while keeping at 170° C. for 5 hours, to obtain a hydrophilic oligomer. Subsequently, the reaction mixture was allowed to cool to room temperature, then, 6.7 g of fluorine end type polyether sulfone (P1) synthesized according to Reference Example 1 was added, thereafter, the mixture was stirred while keeping at 80° C. for 10 hours. The reaction mixture was allowed to cool, then, dropped into a large amount of hydrochloric acid water, and the produced precipitate was recovered by filtration. Further, washing with water and filtration were repeated until the washing liquid became neutral, then, the precipitate was dried under reduced pressure at 60° C., to obtain 9.43 g of a block copolymer a described below.

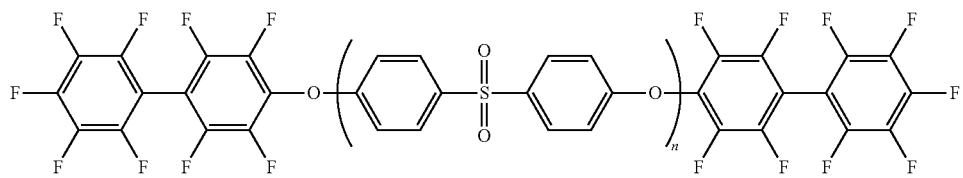

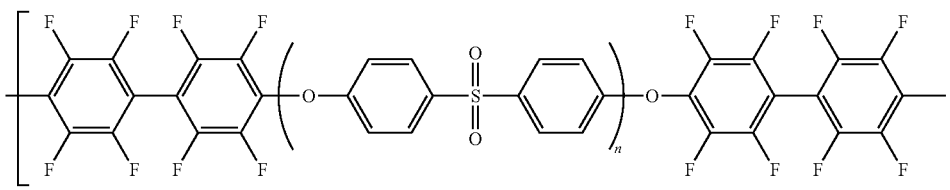

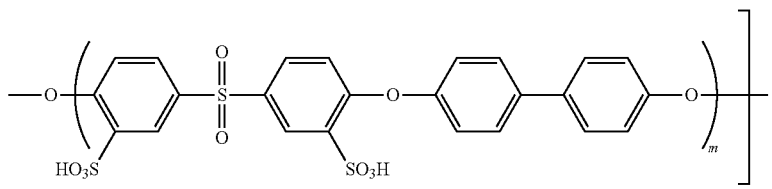

Mn=1.2×10⁵

Ion exchange capacity: 1.04 meq/g

Proton conductivity: $2.22 \times 10^{-2}$ S/cm

From the ion exchange capacity, the weight composition ratio of a segment having an introduced acid group to a segment substantially free from introduced acid groups was calculated to be 30:70.

EXAMPLE 2

Production of Block Copolymer b

Into a flask equipped with an azeotropic distillation apparatus was added 1.9 g (10.2 mmol) of 4,4'-dihydroxybiphenyl, 4.91 g (10 mmol) of dipotassium 4,4'-difluorodiphenylsulfone-3,3'-disulfonate and 1.48 g (10.71 mmol) of potassium carbonate under an Ar atmosphere, and 90 mL of DMSO and 30 mL of toluene were added. Thereafter, toluene was distilled off with heating at a bath temperature of 150° C. to cause azeotropic dehydration in the system, and the mixture was stirred while keeping at 170° C. for 5 hours, to obtain a hydrophilic oligomer. Subsequently, the reaction mixture was allowed to cool to room temperature, then, 9 g of fluorine end type polyether sulfone (P1) synthesized according to Reference Example 1 was added, thereafter, the mixture was stirred while keeping at 140° C. for 3 hours. The reaction mixture was allowed to cool, then, dropped into a large amount of hydrochloric acid water, and the produced precipitate was recovered by filtration. Further, washing with water and filtration were repeated until the washing liquid became neutral, then, the precipitate was dried under reduced pressure at 60° C., to obtain 12.42 g of a block copolymer b described below. Mn=$9.9 \times 10^4$

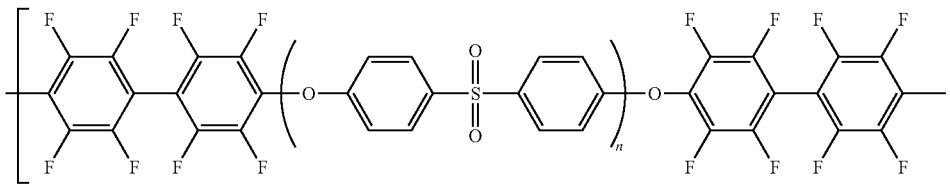

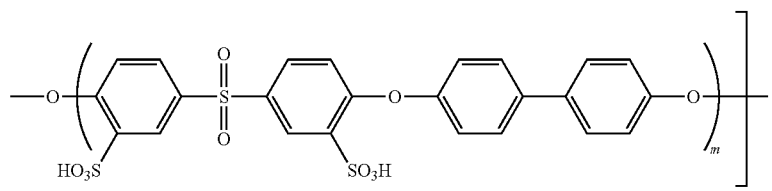

Production of Block Copolymer c 5.00 g of the above-mentioned block copolymer b was dissolved in 100 mL of concentrated sulfuric acid, and sulfonation was effected at room temperature for 48 hours, the product was purified by an ordinary method, to obtain 4.50 g of block copolymer c. This was analyzed by high resolution NMR, and resultantly, the following structure was confirmed.

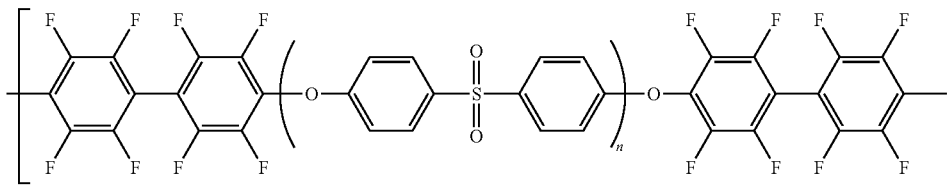

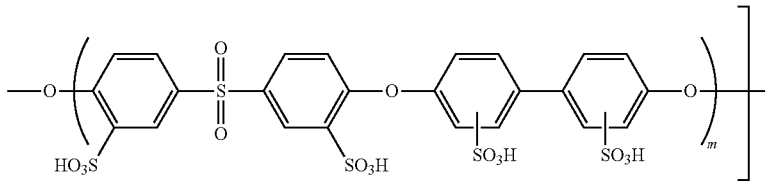

Mn=1.1×10⁵

Ion exchange capacity: 1.51 meq/g

Proton conductivity: $1.1 \times 10^{-1}$ S/cm

From the ion exchange capacity, the weight composition ratio of a segment having an introduced acid group to a segment substantially free from introduced acid groups was calculated to be 27:73.

EXAMPLE 3

Production of Block Copolymer d

Into a flask equipped with an azeotropic distillation apparatus was added 4.63 g (20.3 mmol) of potassium 2,5-dihydroxybenzenesulfonate, 9.81 g (20 mmol) of dipotassium 4,4'-difluorodiphenylsulfone-3,3'-disulfonate and 3.09 g (22.4 mmol) of potassium carbonate under an Ar atmosphere, and 140 mL of DMSO and 50 mL of toluene were added. Thereafter, toluene was distilled off with heating at a bath temperature of 140° C. to cause azeotropic dehydration in the system, and the mixture was stirred while keeping at 170° C. for 5 hours, to obtain a hydrophilic oligomer. Subsequently, the reaction mixture was allowed to cool to room temperature sufficiently, then, 13.00 g of fluorine end type polyether sulfone (P1) synthesized according to Reference Example 1 was added, thereafter, the mixture was stirred while keeping at 80° C. for 30 hours. The reaction mixture was allowed to cool, then, dropped into a large amount of hydrochloric acid water, and the produced precipitate was recovered by filtration. Further, washing with water and filtration were repeated until the washing liquid became neutral, then, the precipitate was dried under reduced pressure at 60° C., to obtain 18.03 g of a block copolymer d described below.

Mn=1.0×10⁵

Ion exchange capacity: 1.76 meq/g

Proton conductivity: $1.72 \times 10^{-1}$ S/cm

From the ion exchange capacity, the weight composition ratio of a segment having an introduced acid group to a segment substantially free from introduced acid groups was calculated to be 33:67.

EXAMPLE 4

Production of Block Copolymer e

Into a flask equipped with an azeotropic distillation apparatus was added 3.95 g (17.29 mmol) of potassium 2,5-dihydroxybenzenesulfonate, 8 g (16.31 mmol) of dipotassium 4,4'-difluorodiphenylsulfone-3,3'-disulfonate and 2.48 g (17.98 mmol) of potassium carbonate under an Ar atmosphere, and 50 mL of DMSO and 30 mL of toluene were added. Thereafter, toluene was distilled off with heating at a bath temperature of 150° C. to cause azeotropic dehydration in the system, and the mixture was stirred while keeping at 150° C. for 7 hours, to obtain a hydrophilic oligomer. Subsequently, the reaction mixture was allowed to cool to room temperature, then, a solution prepared by dissolving 13.78 g of fluorine end type polyether sulfone (P2) synthesized according to Reference Example 2 in 60 mL of DMSO was added, thereafter, the mixture was stirred under thermal insulation while heating up to 140° C. for a total time of 47 hours. The reaction mixture was allowed to cool, then, dropped into a large amount of hydrochloric acid water, and the produced precipitate was recovered by filtration. Further, washing with water and filtration were repeated until the washing liquid became neutral, then, the precipitate was dried under reduced pressure at 60° C., to obtain 14.08 g of a block copolymer e described below.

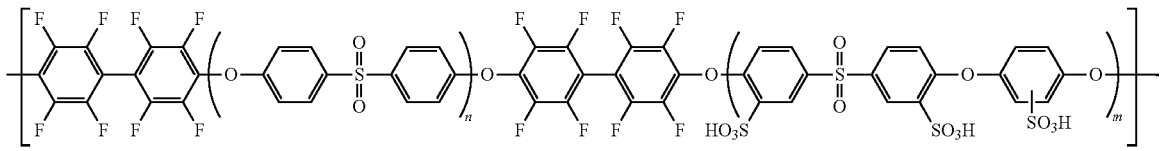

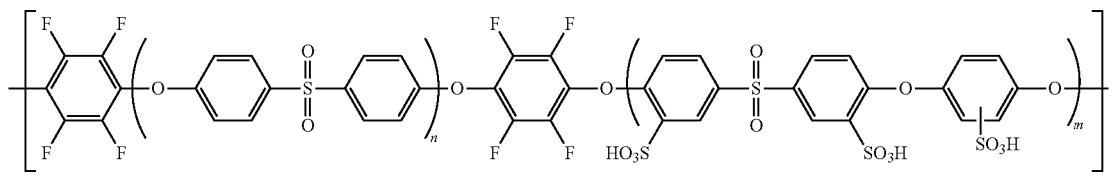

Mn=7.2×10⁴
Ion exchange capacity: 1.60 meq/g
Proton conductivity: $1.13 \times 10^{-1}$ S/cm From the ion exchange capacity, the weight composition ratio of a segment having an introduced acid group to a segment substantially free from introduced acid groups was calculated to be 30:70.

EXAMPLE 5

Production of Block Copolymer f

Into a flask equipped with an azeotropic distillation apparatus was added 0.81 g (3.55 mmol) of potassium 2,5-dihydroxybenzenesulfonate, 2.6 g (5.3 mmol) of dipotassium 4,4'-difluorodiphenylsulfone-3,3'-disulfonate and 2.48 g (3.69 mmol) of potassium carbonate under an Ar atmosphere, and 30 mL of DMSO and 20 mL of toluene were added. Thereafter, toluene was distilled off with heating at a bath temperature of 150° C. to cause azeotropic dehydration in the system, and the mixture was stirred while keeping at 140° C. for 7 hours, to obtain a hydrophilic oligomer. Further, into a flask equipped with an azeotropic distillation apparatus was added 2.87 g (11.47 mmol) of 4,4'-dihydroxydiphenylsulfone, 2.46 g (9.68 mmol) of 4,4'-difluorodiphenylsulfone and 1.66 g (12.01 mmol) of potassium carbonate under an Ar atmosphere, and 30 mL of DMSO and 20 mL of toluene were added. Thereafter, toluene was distilled off with heating at a bath temperature of 150° C. to cause azeotropic dehydration in the system, and the mixture was stirred while keeping at 140° C. for 7 hours, to obtain a hydrophobic oligomer. Subsequently, the reaction mixture was allowed to cool to room temperature, then, the resultant hydrophilic oligomer solution was added to the hydrophobic oligomer solution, and the mixture was stirred under thermal insulation while heating up to 150° C. for a total time of 13 hours. The reaction mixture was allowed to cool, then, dropped into a large amount of hydrochloric acid water, and the produced precipitate was recovered by filtration. Further, washing with water and filtration were repeated until the washing liquid became neutral, then, the precipitate was dried under reduced pressure at 60° C., to obtain 7.06 g of a block copolymer f described below.

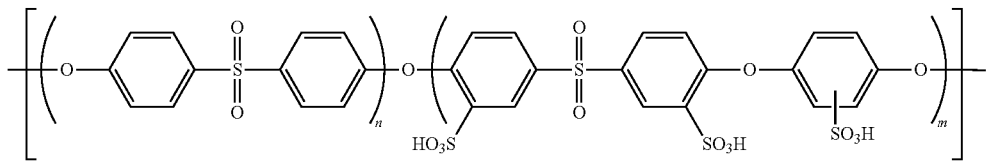

Mn=9.0×10⁴
Ion exchange capacity: 1.60 meq/g
Proton conductivity: $9.70 \times 10^{-2}$ S/cm From the ion exchange capacity, the weight composition ratio of a segment having an introduced acid group to a segment substantially free from introduced acid groups was calculated to be 30:70.

EXAMPLE 6

Production of Block Copolymer g

Into a flask equipped with an azeotropic distillation apparatus was added 2.69 g (11.77 mmol) of potassium 2,5-dihydroxybenzenesulfonate, 5.11 g (11 mmol) of dipotassium 4,4-difluorobenzophenone-3,3'-disulfonate and 1.69 g (12.24 mmol) of potassium carbonate under an Ar atmosphere, and 50 mL of DMSO and 30 mL of toluene were added. Thereafter, toluene was distilled off with heating at a bath temperature of 150° C. to cause azeotropic dehydration in the system, and the mixture was stirred while keeping at 150° C. for 7 hours, to obtain a hydrophilic oligomer. Subsequently, the reaction mixture was allowed to cool to room temperature sufficiently, then, a solution prepared by dissolving 10.25 g of fluorine end type polyether sulfone (P1) synthesized according to Reference Example 1 in 50 mL of DMSO was added, thereafter, the mixture was stirred under thermal insulation while heating up to 140° C. for a total time of 34 hours. The reaction mixture was allowed to cool, then, dropped into a large amount of hydrochloric acid water, and the produced precipitate was recovered by filtration. Further, washing with water and filtration were repeated until the washing liquid became neutral, then, the precipitate was dried under reduced pressure at 60° C., to obtain 14.63 g of a block copolymer g described below.

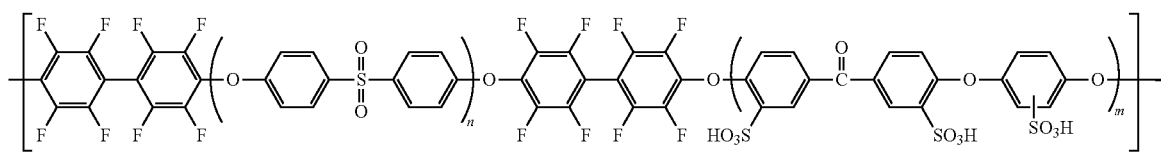

Mn=$1.9 \times 10^5$

Ion exchange capacity: 1.70 meq/g

Proton conductivity: $1.14 \times 10^{-1}$ S/cm

From the ion exchange capacity, the weight composition ratio of a segment having an introduced acid group to a segment substantially free from introduced acid groups was calculated to be 30:70.

EXAMPLE 7

A block copolymer (ion exchange capacity: 1.43 meq/g) produced according to Example 4 was dissolved in NMP to prepare a polymer electrolyte solution having a concentration of 25.5 wt %.

Then, a polyethylene porous membrane A was fixed on a glass plate, and on this, the above-mentioned polymer electrolyte solution was dropped. Using a wire coater, the polymer electrolyte solution was spread uniformly on the porous membrane, the coating thickness was controlled using a bar coater having a clearance of 0.3 mm, and the membrane was dried under normal pressure at 80° C. Thereafter, the membrane was immersed into 1 mol/L hydrochloric acid, further, washed with ion exchange water, to obtain a polymer electrolyte composite membrane.

Ion exchange capacity: 1.17 meq/g

Proton conductivity: $7.96 \times 10^{-2}$ S/cm

| Evaluation of fuel cell performance | | | | |
| --- | --- | --- | --- | --- |
| Voltage E (V): | 0.8 | 0.6 | 0.4 | 0.2 |
| Current value I (A/cm$^2$): | 0.17 | 0.17 | 1.10 | 1.40 |
| Methanol permeation coefficient: | $1.86 \times 10^{-7}$ cm$^2$/sec | | | |

The block copolymer of the present invention shows excellent performances in various properties such as a membrane forming property, chemical stabilities such as oxidation resistance, radical resistance, hydrolysis resistance and the like, membrane mechanical strength, water resistance and proton conductivity and the like, as a proton conductive membrane for polymer electrolytes, particularly, fuel cells. It is excellent particularly in proton conductivity.

In addition, the block copolymer of the present invention is industrially advantageous, as a polymer electrolyte since it shows a high power generation property.

The invention claimed is:

1. A block copolymer comprising at least one segment having an acid group which is represented by the following formula (4) and at least one segment substantially free from acid groups which comprises repeating units represented by the following formula (2):

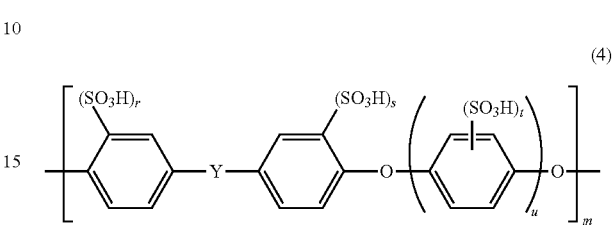

(wherein, m represents an integer of 10 or more, Y represents —CO— or —SO$_2$—, each Y in the segment being independently —CO— or —SO$_2$—, r and s each represent 1, u represents 1 or 2, and t represents 1 or 2)

(wherein, n represents an integer of 10 or more, Ar$^4$ and Ar$^5$ represent each independently a divalent aromatic group which is optionally substituted by an alkyl group having 1 to 10 carbon atoms, alkoxy group having 1 to 10 carbon atoms, aryl group having 6 to 10 carbon atoms, aryloxy group having 6 to 10 carbon atoms or fluoro group. Z represents —CO— or —SO2—, and each 2 in the segment being independently —CO— or —SO$_2$—), wherein the weight composition ratio of a segment having an acid group to a segment substantially free from acid groups is from 27:73 to 33:67.

2. The block copolymer according to claim 1, wherein the acid group is a strong acid group or a super strong acid group.

3. The block copolymer according to claim 1, wherein the segment substantially free from acid groups is represented the following formula (3):

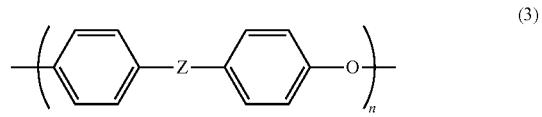

(wherein, n and Z have the same meaning as described above).

4. The block copolymer according to claim 1, wherein the ion exchange capacity is from 0.8 meq/g to 2.4 meq/g.

5. A polymer electrolyte comprising the block copolymer according to claim 1 as an effective component.

6. A polymer electrolyte membrane comprising the polymer electrolyte according to claim 5.

7. A polymer electrolyte composite membrane comprising the polymer electrolyte according to claim 5, and a porous substrate.

8. A catalyst composition comprising the polymer electrolyte according to claim 5.

9. A polymer electrolyte fuel cell comprising the polymer electrolyte membrane according to claim 6.

10. A polymer electrolyte fuel cell comprising the polymer electrolyte composite membrane according to claim 7.

11. A polymer electrolyte fuel cell comprising the catalyst composition according to claim 8.

12. The block copolymer according to claim 1, wherein the number average molecular weight of the block copolyer is 5,000 to 1,000,000.

* * * * *